(12) United States Patent
Christensson et al.

(10) Patent No.: US 10,662,098 B2
(45) Date of Patent: May 26, 2020

(54) BIOLOGICAL REMOVAL OF MICROPOLLUTANTS FROM WASTEWATER

(71) Applicant: VEOLIA WATER SOLUTIONS & TECHNOLOGIES SUPPORT, Saint-Maurice (FR)

(72) Inventors: Magnus Christensson, Lund (SE); Thomas Welander, Furulund (SE)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 142 days.

(21) Appl. No.: 16/082,850

(22) PCT Filed: Mar. 7, 2017

(86) PCT No.: PCT/EP2017/055234
§ 371 (c)(1),
(2) Date: Sep. 6, 2018

(87) PCT Pub. No.: WO2017/153361
PCT Pub. Date: Sep. 14, 2017

(65) Prior Publication Data
US 2019/0100452 A1    Apr. 4, 2019

(30) Foreign Application Priority Data

Mar. 9, 2016 (SE) .................................. 1650321

(51) Int. Cl.
*C02F 3/12* (2006.01)
*C02F 3/30* (2006.01)
(Continued)

(52) U.S. Cl.
CPC ............... *C02F 3/121* (2013.01); *C02F 3/30* (2013.01); *C02F 3/303* (2013.01); *C02F 3/305* (2013.01);
(Continued)

(58) Field of Classification Search
None
See application file for complete search history.

(56) References Cited

U.S. PATENT DOCUMENTS 5,651,892 A    7/1997 Pollock
2007/0251868 A1* 11/2007 Bailey, Jr. ............... C02F 3/121
210/195.3
(Continued)

FOREIGN PATENT DOCUMENTS

CN    201896101 U    7/2011
EP    1431252 A2    6/2004
(Continued)

OTHER PUBLICATIONS

Pusker Regmi et al., "NOB Repression for Mainstream Nitrite-Shunt and Deammonification: A Pilot Study," WEFTEC 2013: Session 26 through Session 34, pp. 1959-1981.
(Continued)

*Primary Examiner* — Chester T Barry
(74) *Attorney, Agent, or Firm* — Honigman LLP; Anna M. Budde

(57) ABSTRACT

The invention pertains to a method (200, 300, 400) of at least partly removing at least one micropollutant from wastewater (104) comprising carbogenous compounds and at least one micropollutant. The method comprising the steps of: (a) dividing the wastewater (104) into a main stream (105) and a side stream (106); (b) treating main stream (105) with bacteria to reduce the content of carbogenous compounds to provide depleted wastewater (107) comprising at least one micropollutant; (c) treating the depleted wastewater (107) with a second portion of microorganisms (162), having the ability of degrading the at least one micropollutant, to, at least partly, remove the at least one micropollutant thereby providing treated water (170), wherein the second portion of microorganisms (162) have been enriched by feeding the
(Continued)

side stream (106) to it before using the second portion of microorganisms (162) in treating the depleted wastewater (107); and (d) feeding a first portion of microorganisms (161), having the ability of degrading the at least one micropollutant, with the side stream (106), to enrich them for subsequent use in treating the depleted wastewater (107) to at least partly remove the at least one micropollutant.

20 Claims, 8 Drawing Sheets

(51) Int. Cl.
*C02F 101/30* (2006.01)
*C02F 101/32* (2006.01)
*C02F 101/34* (2006.01)
*C02F 103/00* (2006.01)
*C02F 3/10* (2006.01)
*C02F 3/34* (2006.01)
*C02F 101/10* (2006.01)

(52) U.S. Cl.
CPC ............... *C02F 3/10* (2013.01); *C02F 3/302* (2013.01); *C02F 3/308* (2013.01); *C02F 3/341* (2013.01); *C02F 2101/10* (2013.01); *C02F 2101/305* (2013.01); *C02F 2101/306* (2013.01); *C02F 2101/327* (2013.01); *C02F 2101/345* (2013.01); *C02F 2103/003* (2013.01); *C02F 2203/004* (2013.01); *C02F 2209/08* (2013.01); *C02F 2301/043* (2013.01); *C02F 2301/08* (2013.01); *Y02W 10/15* (2015.05)

(56) References Cited

U.S. PATENT DOCUMENTS

2013/0337518 A1   12/2013   Razavi-Shirazi et al.
2016/0257589 A1*   9/2016   Wett .................. C02F 3/006

FOREIGN PATENT DOCUMENTS

WO   2000015565 A2   3/2000
WO   2004087583 A1   10/2004
WO   2013151836 A1   10/2013

OTHER PUBLICATIONS

International Search Report and Written Opinion of PCT/EP2017/055234, dated May 16, 2017.

* cited by examiner

BIOLOGICAL REMOVAL OF MICROPOLLUTANTS FROM WASTEWATER

This application is a 35 USC § 371 United States national stage application of International Application No. PCT/EP2017/055234, filed Mar. 7, 2017, which is incorporated herein by reference in its entirety, and which claims priority to Swedish Patent Application No. 1650321-1, filed Mar. 9, 2016.

TECHNICAL FIELD

The present invention relates to a method for removing micropollutants such as pharmaceutical residues from wastewater.

BACKGROUND

Micropollutants such as pharmaceutical residues and other emerging substances are removed from wastewater to a very limited degree by existing treatment processes. The micropollutants typically pass through modern sewage treatment plants (STPs) and end up in receiving waters and sludge. Several studies have detected micropollutant concentrations in receiving waters and sludge at levels detrimental to aquatic organisms.

The term "micropollutants" relates to organic or mineral substances whose toxic, persistent and bioaccumulative properties may have a negative effect on the environment and/or organisms (e.g. the feminisation of fish due to endocrine-effect substances in the aquatic environment), and even on human health. Micropollutants are trace compounds that occur in small amounts in the environment. They are present in many products that we consume daily (drugs, cosmetics, phytosanitary products, insecticides, etc.), at the home or in industry.

There are many different classes of micropollutants. Among them are pharmaceuticals, such as contraceptives, painkillers, lipid regulators, beta-blockers, antibiotics, tranquilizers, and psychostimulants. Over 200,000 different drugs and health products are registered in the US, Canada, European Union, Japan, and other countries. In wastewater and surface water, human and veterinary pharmaceuticals typically occur in low range concentrations of ng/L (e.g. synthetic hormones), low to high range concentrations of ng/L (e.g. ß-blockers, antibiotics and antiepileptics), and up to concentrations of hundreds of ng/L (e.g. painkillers, lipid regulators and X-ray contrast media). However, there are also many other classes, such as personal care products (PCPs), biocides, and industrial chemicals. Apart from man-made micropollutants, minute quantities of naturally-occurring toxicants, such as mycotoxins (e.g. nicotine), mycotoxins, and pyrethrins, are present and can affect organisms.

Current sewage treatment plant treatment technologies are usually not able to remove micropollutants. Physical tertiary treatment of micropollutant-containing wastewater using adsorption materials such as activated carbon filtration to remove micropollutants is known in the art. However, while activated carbon is able to remove soluble micropollutants from wastewater, separation and disposal of the micropollutants from the carbon is then required. Advanced oxidation with oxidising agents such as ozone is expensive and oxidation of the micropollutants may lead to new compounds that are potentially more toxic and require further treatment before disposal.

Microbial degradation of micropollutants has been suggested as an energy efficient solution to solve the draw-backs with ozonation and activated carbon.

Microbial degradation of micropollutants with technologies that typically provide long sludge retention times, such as membrane biological reactors and moving bed biofilm reactors (MBBRs), have shown promise at removing micropollutants. However, implementing tertiary treatment for micropollutant removal with a biological system has been limited by factors including sustaining the amount of microbial biomass available for the degradation and the low concentration of micropollutants in the wastewater. In turn this has led to low micropollutant removal rates.

WO 00/15565 A2 discloses a bioreactor having a bed of buoyant media pellets floating within a filtrate to be processed. The bioreactor is used to culture microorganisms and algae for various purposes.

EP 1 431 252 A2 discloses a filter element for a clarification device for biological water treatment. The filter has a biological treatment stage in which water is treated by aerobic microorganisms resident on a shallow, dished body that is open on one or both sides.

CN 201896101 U discloses a microbe suspending medium for a moving bed biofilm reactor that enlarges the carrier surface area, is beneficial for adhering and growing microbes, and increases the contact rate of a biofilm and oxygen.

WO 2013/151836 A1 discloses a process for removing ammonium from a wastewater stream. The process utilises ammonium oxidizing bacteria (AOB) and anaerobic ammonium oxidizing bacteria (ANAMMOX).

Pusker Regmi et al.: *NOB Repression for Mainstream Nitrite-Shunt and Deammonification: A Pilot Study*. WEFTEC 2013. Proceedings of the Water Environment Federation, WEFTEC 2013: Session 26 through Session 34, pp. 1959-1981 (23) disclose a two stage study to prove the viability of mainstream NOB suppression and deammonification in wastewater treatment.

There remains a need for an improved method of treating wastewater to remove micropollutants therefrom.

SUMMARY

The present invention seeks to mitigate, alleviate, circumvent or eliminate at least one, such as one or more, of the above-identified deficiencies by providing a method for at least partly removing at least one micropollutant from wastewater, comprising carbogenous compounds and at least one micropollutant. The method comprises the steps of: (a) dividing the wastewater into a main stream and a side stream, (b) treating main stream with bacteria to reduce the content of carbogenous compounds to provide depleted wastewater comprising at least one micropollutant, (c) treating the depleted wastewater with a second portion of microorganisms, having the ability of degrading the at least one micropollutant, to, at least partly, remove the at least one micropollutant thereby providing treated water, wherein the second portion of microorganisms have been enriched by feeding the side stream to it before using the second portion of microorganisms in treating the depleted wastewater, (d) feeding a first portion of microorganisms, having the ability of degrading the at least one micropollutant, with the side stream, to enrich them for subsequent use in treating the depleted wastewater to at least partly remove the at least one micropollutant. Further advantageous embodiments are disclosed below and in the appended patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DESCRIPTION OF EMBODIMENTS

The following description focuses on three embodiments of the present invention applicable to a method of treating wastewater to remove micropollutants. However, it will be appreciated that the invention is not limited to this application but may be applied to other water sources.

Figure 1:
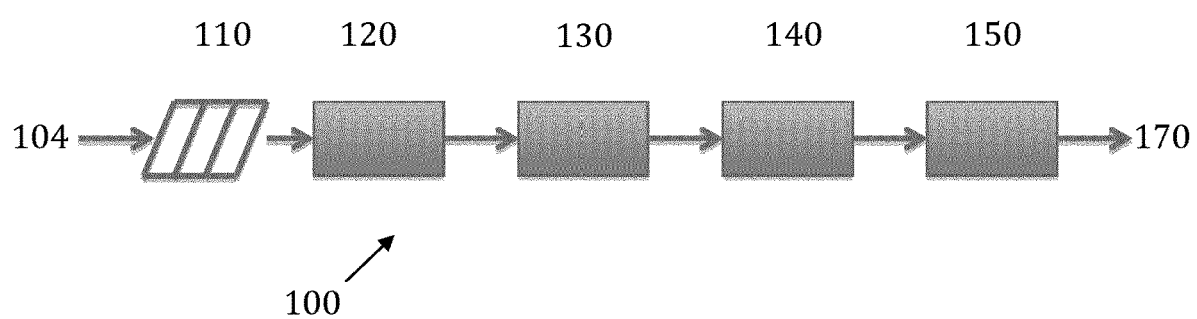
FIG. 1 shows a prior art method of treating wastewater.

FIG. 1 depicts a known method 100 of treating wastewater. In treating wastewater it is important for many discharge areas to reduce not only the organic matter (i.e. carbon) but also the content of nitrogen and phosphorus compounds in order to prevent eutrophication. The most common way to extensively remove nitrogen is through biological nitrification and denitrification where nitrifying bacteria oxidise ammonia to nitrate under aerobic conditions and denitrifying bacteria reduce the produced nitrate to nitrogen gas under anoxic conditions.

In method 100 the raw untreated wastewater is screened 110 to remove large objects such as hair, paper and cloth. Screening 110 may utilise a bar screen. The wastewater is then subjected to sedimentation and/or filtration 120 where smaller particles that passed through screening 110 are removed. Sedimentation and/or filtration 120 may be performed by a sedimentation unit or a filtration unit under the influence of gravity. Soluble organic matter is barely removed by screening 110 and sedimentation 120. Thus the wastewater is then subjected to biological oxidation under aerobic conditions 130 to convert the carbon contents to carbon dioxide and water. Remaining ammonia, which is not used for assimilation to build up new biomass, needs to be oxidised by nitrifying bacteria, including the ammonium oxidising bacteria oxidising ammonia to nitrite and the nitrite oxidising bacteria further oxidising the nitrite to nitrate. In an aerobic nitrification step 140, bacteria contained in a sludge or provided on carrier elements (not shown) will consume organic compounds and oxidise ammonium to nitrate, $NO_3^-$. The nitrification step 140 is dependent on air being pumped through the vessel containing the sludge and the wastewater, since oxygen is required for oxidising the organic compounds and the ammonium to nitrate. The nitrifying bacteria are slow-growing autothropic bacteria, which is why it is common to provide separate stage(s) for nitrification 140 to prevent the nitrifiers from being out-competed by fast-growing heterotrophic bacteria. However, both organic carbon oxidation and nitrification can take place in the same stage if the average sludge retention time (SRT) is long enough. Nitrate produced from the nitrification stage is then denitrified in an anoxic denitrification stage 150. This step takes place under anoxic conditions, i.e. without oxygen, and also requires an electron donor, for example in the form of biodegradable organic matter (CH) in order to reduce the nitrate to $N_2$. When the denitrification stage 150 is placed after the nitrification stage 140, the naturally available biodegradable soluble carbon required for dentrification is very low due to the previous aerobic oxidation and not enough for the denitrification typically needed. By adding external carbon sources, such as methanol or ethanol, a high denitrification rate can be obtained and low effluent concentrations of nitrate can be achieved. However, external carbon sources are often expensive and result in a high operation cost. It is therefore common to include an anoxic pre-denitrification stage prior to the aerobic stage(s) to which nitrified wastewater is brought back with internal recirculation. In this way the naturally present carbon is used as carbon source instead of, or in addition to, externally added carbon source. The draw-back is the lower denitrification rate obtained in pre-denitrification stage(s) compared to post-denitrification stage(s). To reach low effluent nitrate concentrations with only pre-denitrification requires high internal recirculation flows, with disadvantages such as large internal pump installations with increased electricity demand and much higher hydraulic loading through the reactor stages. In method 100, the treated water 170 is obtained after the denitrification stage 150. In embodiments below, the water treated according to the method 100 will be referred to as depleted wastewater 107, since the level of nutrients in the treated water is very low. In one embodiment, the depleted wastewater (107) is defined by a biochemical oxygen demand (BOD) of 0 to 100 $gO_2/m^3/5d$, or 0 to 50 $gO_2/m^3/5d$ or preferably 0 to 10 $gO_2/m^3/5d$. In one embodiment, the depleted wastewater (107) is defined by a biochemical oxygen demand (BOD) of 0 to 100 $gO_2/m^3/5d$, or 0 to 50 $gO_2/m^3/5d$ or preferably 0 to 10 $gO_2/m^3/5d$, an ammonium ($NH_4^+$) concentration of 0 to 200 mg(N)/l, or 0 to 50 mg(N)/l, or preferably 0 to 20 mg(N)/l and an $NO_2^-$ concentration of 0 to 200 mg(N)/l, or 0 to 50 mg(N)/l, or preferably 0 to 20 mg(N)/l.

Phosphorus from the wastewater can, in addition to the phosphorus required for bacterial cell growth, be removed with chemical enhanced precipitation or with Enhanced Biological Phosphorus removal (EBPR), or with a combination of both.

Chemical enhanced methods include adding metal salts, such as iron or aluminium, to the wastewater precipitating the soluble phosphorus. This can be done as part of the primary treatment, removing the chemical sludge with the primary solids in the pre-sedimentation or filter unit or it can be done as part of a post-treatment, where the chemicals are added to the effluent wastewater from the biological stage and removed as chemical sludge in sedimentation or filter units. A simultaneous precipitation can also be applied, where chemicals are added into the biological stage(s) and chemical and biological sludge is separated in sedimentation units and leaves the process as excess sludge. In the EBPR process, an enrichment of phosphate accumulating organisms (PAO), is obtained by alternating exposing bacteria to anaerobic conditions, with no electron acceptors, such as oxygen or nitrate, are present, and to aerobic or anoxic conditions, where oxygen or nitrate is used for phosphate uptake.

Current sewage treatment plants are not able to remove micropollutants to a satisfactory level. In a sewage treatment plant, micropollutants will be dissolved in the wastewater or adsorbed to the sludge and can be broken down to some extent by chemical or biochemical processes (such as hydrolysis, oxidation, or photodegradation) and biotransformed enzymatically. For example, it has been found that during nitrogen removal, micropollutants may also be removed to some extent. However, in current sewage treatment plants, this is not sufficient to completely eliminate different micropollutants from the wastewater.

Micropollutants are generally recognized as "non-growth substrates" as they are found in wastewater in concentration too low to support biomass growth. Therefore, biotransformation of micropollutants is mainly carried out through the process of co-metabolism, where the removal of non-growth substrates requires the presence of primary substrates (i.e COD, nutrients) to support biomass growth. Furthermore, co-metabolism is the result "the lack of specificity of enzymes and co-factors", where the biotransformation of the micropollutant is the results of an "intended" (co-metabolic) degradation reactions. Primary substrate and micropollutant compete for the same active center of the non-specific enzyme.

Although, co-metabolism has been seen as the main removal pathways for micropollutants, numerous studies investigate the direct metabolism of the organic compounds, where the microorganisms utilize the micropollutants as sole energy and carbon source. Culture of *Sphingomonas* were found able to degrade ibuprofen as only carbon source as well Novosphingobium JEM-1 able to degrade estradiol (E2). However, micropollutants are in general found in concentrations too low to be removed via metabolism.

In the invention, the above and other problems are solved or at least mitigated by the invention for biological removal of micropollutants, where the bacteria in the biological process for micropollutant removal is periodically exposed to a high content of an easily biodegradable carbon source and periodically exposed to a wastewater stream with a low content of an easily biodegradable carbon source (i.e. depleted wastewater 107) thereby providing conditions for enhanced micropollutant removal.

During the anaerobic phase, easily biodegradable carbon sources, such as volatile fatty acids (VFA) are taken up by the bacteria and stored internally as polyhydroxy alcanoic acids (PHA). Energy required for PHA storage under anaerobic conditions is obtained from cleavage of previously stored polyphosphate and glycogen. When bacteria enriched in PHA enter into anoxic or aerobic conditions, PHA is used as carbon source for cell growth and re-storage of polyphosphate and glycogen.

The exposure to easily biodegradable carbon can either be done by temporarily switching the water flow to the biological reactor(s) from the water for micropollutant removal (i.e. depleted wastewater 107), being low in biodegradable carbon, to a water with significantly much higher content of easily biodegradable carbon or by moving the bacteria, preferable, but not solely, present as biofilm on a support media such as the suspended carriers in an Moving Bed Biofilm Reactor (MBBR), but not the water, to a new vessel where the water contains a significantly much higher content of easily biodegradable carbon.

In both cases, the key advantage of supplying starved/famine microorganisms, such as bacteria, towards easily biodegradable carbon provides organic substrate(s) through adsorption, absorption and growth for improved micropollutant removal under conditions where biodegradable carbon is low and limited. With the presented schemes, carbon source can for example be transferred from biological untreated wastewater in the early steps of the treatment line (here called side stream 106 wastewater) to the down-stream part of the treatment line, without bringing along the initial high concentrations of micropollutants, nitrogen and phosphorus. Thus, in the invention, the wastewater is divided to a side stream 106 of biologically untreated wastewater before or in the early steps of the treatment line and a main stream 105 which is treated with bacteria to reduce the content of carbogenous compounds to provide depleted wastewater 107. The depleted wastewater still high in content of micropollutants is then treated with microorganisms, such as bacteria, having the ability of degrading at least one micropollutant, to, at least partly, remove the at least one micropollutant and providing treated water 170. To enable the microorganisms, such as bacteria, to maintain a viable culture and effectively remove micropollutans from the depleted water 107, the microorganisms in the biological process for micropollutant removal are periodically exposed to a high content of biodegradable carbon.

Figure 2:
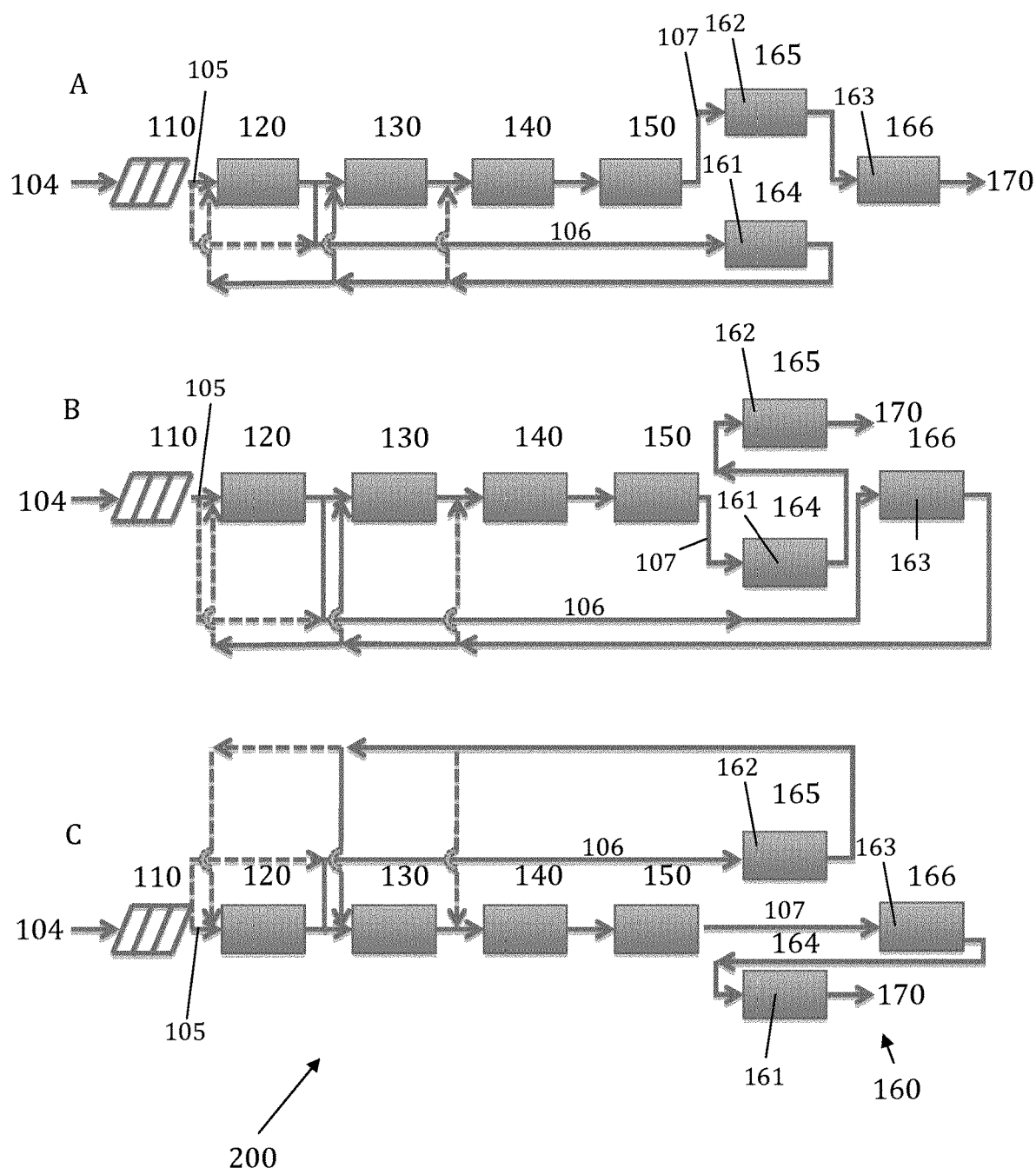
FIGS. 2A-C illustrate a method of treating wastewater according to one embodiment of to the present invention.
Figure 3:
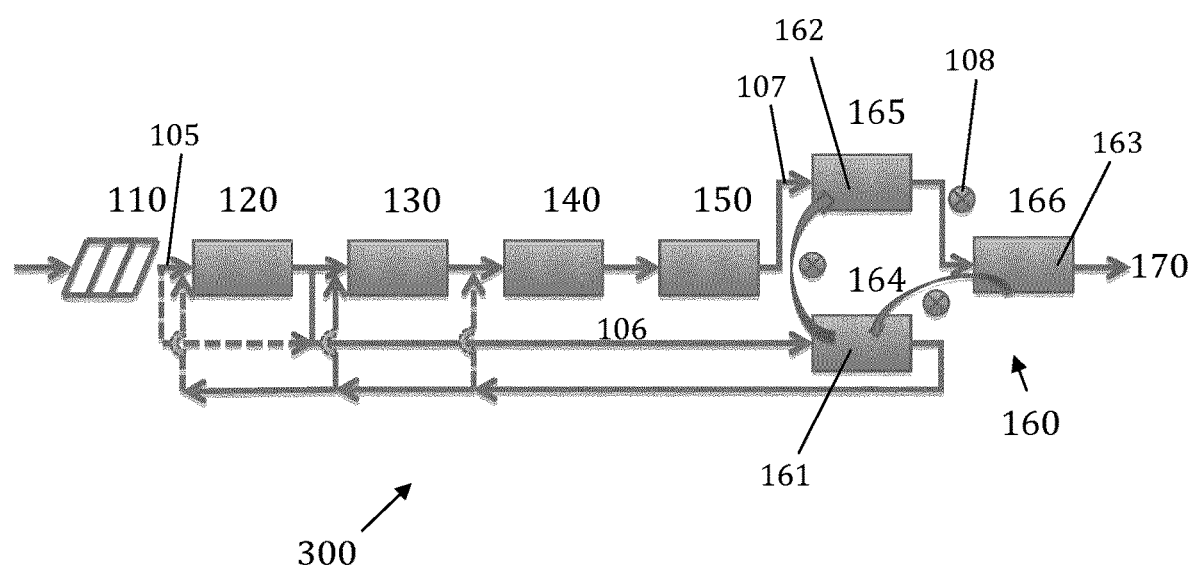
FIG. 3 depicts a method of treating wastewater according to an alternative embodiment of to the present invention.
Figure 4:
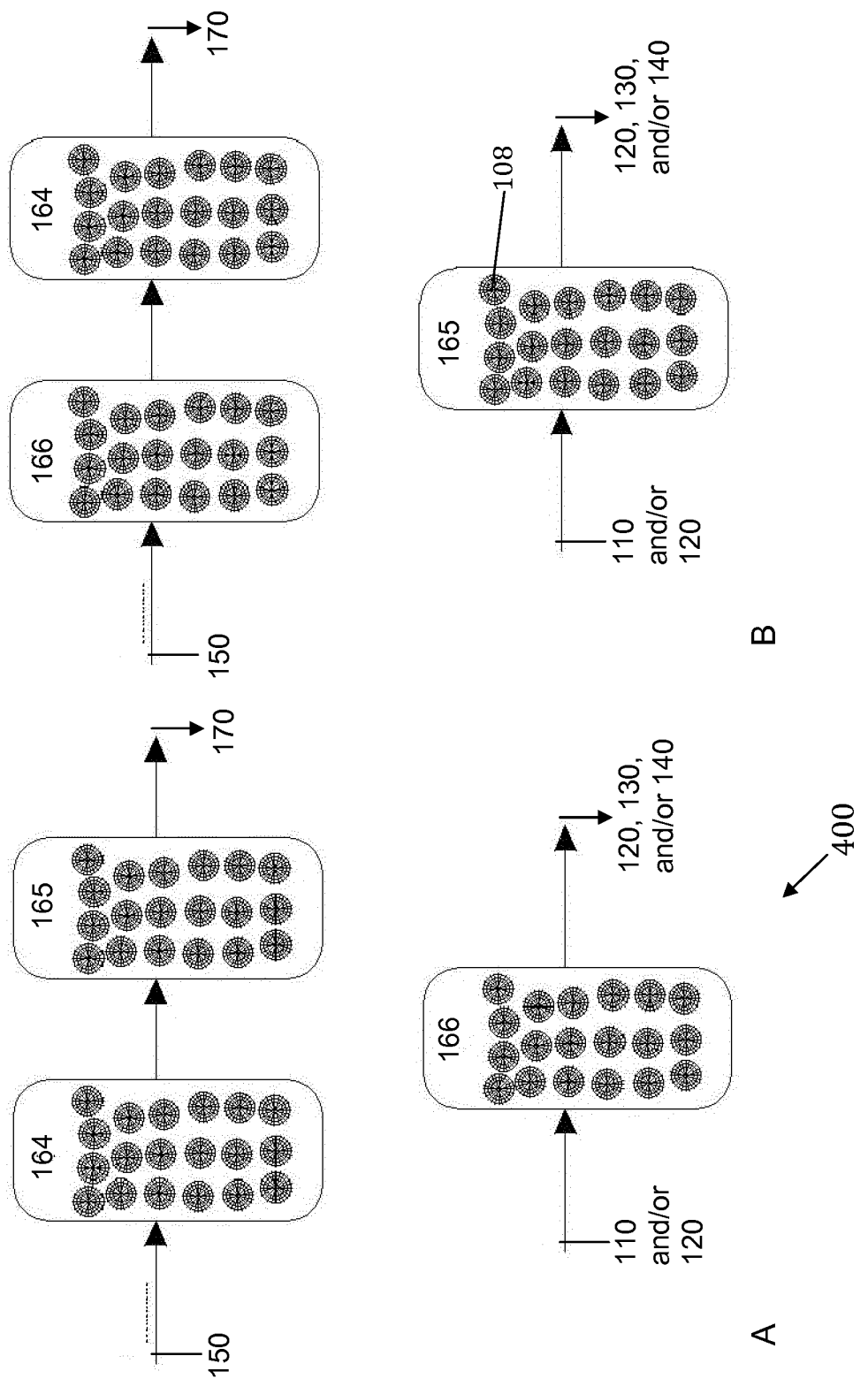
FIGS. 4A-B show a method of treating wastewater according to another embodiment of to the present invention.

Thus, in one embodiment, a method 200, 300, 400 is provided for at least partly removing at least one micropollutant from wastewater 104 together with carbogenous compounds. With reference to FIGS. 2 to 4, the method comprises the steps of: (a) dividing the wastewater 104 into a main stream 105 and a side stream 106; (b) treating main stream 105 with bacteria to reduce the content of carbogenous compounds to provide depleted wastewater 107 comprising at least one micropollutant; (c) treating the depleted wastewater 107 with a second portion of microorganisms 162, having the ability of degrading the at least one micropollutant, to, at least partly, remove the at least one micropollutant thereby providing treated water 170, wherein the second portion of microorganisms 162 have been enriched by feeding the side stream to it before using the second portion of microorganisms 162 in treating the depleted wastewater 107; and (d) feeding a first portion of microorganisms 161, having the ability of degrading the at least one micropollutant, with the side stream 106, to enrich them for subsequent use in treating the depleted wastewater 107 to at least partly remove the at least one micropollutant.

The nutrient level of the side stream 106 must be high enough to feed the microorganisms, such as bacteria, and as such has a high level of biodegradable carbon. This can be measured as the amount of dissolved oxygen needed by aerobic biological organisms to break down organic material present in a given water sample at certain temperature over a specific period of time (here 5 days and 20° C.)). Thus, in one embodiment, the biochemical oxygen demand (BOD) of the side stream 106 wastewater is higher than the biochemical oxygen demand (BOD) of the depleted wastewater 107. In one embodiment, the biochemical oxygen demand (BOD) of the side stream 106 wastewater is higher than 100 $gO_2/m^3/5d$, containing a level of biodegradable carbon.

In one embodiment, the side stream 106 is fed back to the main stream 105 in step (b) for treatment with bacteria to reduce the content of carbogenous compounds, after the side stream 106 has been used for feeding microorganisms 161, 162, or 163 in step (d).

As an alternative to using biological untreated wastewater as a source of biodegradable carbon, external carbon dosage can be temporarily supplied to the microorganisms depleted on carbon. Thus in one embodiment, a carbon additive, such as methanol or ethanol, is added to the side stream 106 wastewater to adjust the biochemical oxygen demand (BOD) to at least 100 g$O_2$/m$^3$/5d.

The microorganisms for micropollutant removal, such as bacteria and fungi, have a unique capacity to make use of the chemical compounds that micropollutants represent either for energy regeneration or as building blocks for growth or other ways of creating favourable conditions for growth. The vast variety of chemical compounds, representing thousands of different man-made compounds, will have a direct impact on the microbial consortia established in the biological treatment system. Since different microorganisms have different capabilities to degrade micropollutants, given by the microbial genome and environmental conditions, each wastewater with micropollutants will give rise to an unique bacterial consortia due to that no wastewater will have an identical composition of micropollutants. However, in common for all biological systems are, that microorganisms will primarily choose compounds that give highest possible growth with lowest possible requirements, why degradation of more recalcitrant micropollutants are initiated first when more favourable substrates are consumed. Micropollutants are typically present in low concentrations and require a high energy-input for the microorganisms compared to the gained benefits of energy or building blocks, why growth rate decreases significantly.

Thus, the microorganisms for micropollutant removal will automatically adjust to the micronutrients in the wastewater being treated. An important consequence of this is that the method of the invention will work for and adapt to new micropollutants. Many micropollutants are 'emerging contaminants', that is, contaminants chemicals that have only recently been analyzed or identified in the environment. Emerging contaminants may be found due to successful reduction of known primary pollutants, advances of analytical technologies, emergence of new hazardous compounds from development and production of new compounds or slow build-up of contaminants from sources such as disinfectants, sunscreens/UV filters, perfluorinated compounds and brominated flame retardants. Since a large range of novel chemicals are developed each year, new hazardous compounds continue to emerge.

In addition to micropollutant removal, additional benefits can be obtained in the method of the invention with enhanced nitrogen and phosphorus removal, where improved micropollutant removal can be achieved in combination with post-denitrification and/or enhanced phosphorus removal with phosphate accumulating organisms (PAO). Thus, if the depleted wastewater 107 contains higher levels of nitrogen and phosphorus, the microorganisms for micropollutant removal may also adjust to include post-denitrification and/or enhanced phosphorus removal with PAO.

Figure 5A:
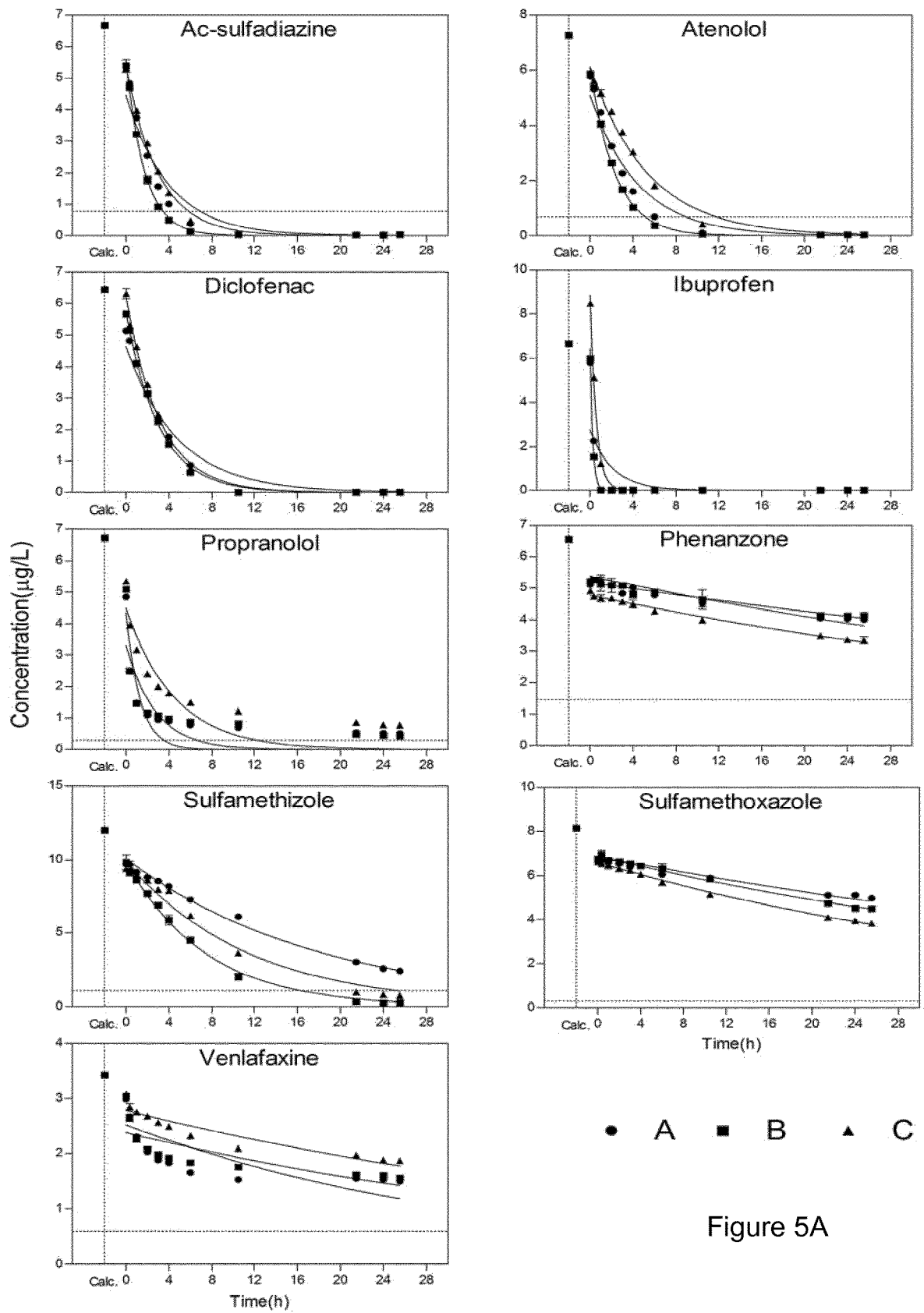
FIGS. 5A-B show the concentration of various micropollutants with time in wastewater treated according to the method in FIGS. 4A-B.
Figure 5B:
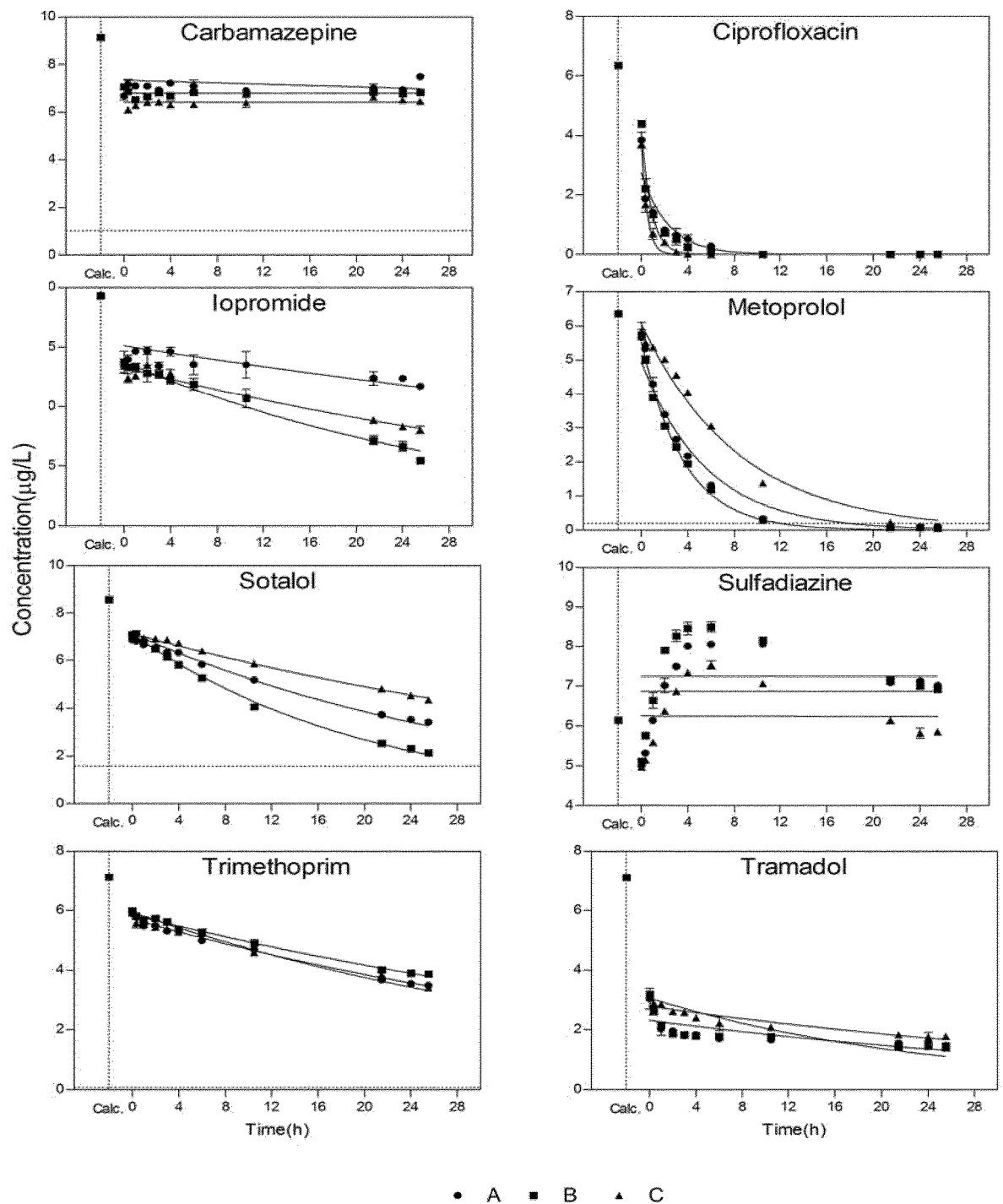

In FIGS. 5A-B experimental trials using the method of the invention are summarized. After 4 months of continuous operation using effluent from a wastewater treatment plant and diluted raw wastewater, 17 recalcitrant spiked pharmaceuticals (at concentrations of 3.43-19.32 ug/L) were added to the effluent from the wastewater treatment plant for removal. The pharmaceuticals were selected from common micropollutants often present in communal wastewater, such as was used during the trials. It was found that after the 4 months of operation, 14 out of the 17 compounds were degraded to more than 20%, as seen in FIGS. 5A-B. Surprisingly, even drugs such as diclofenac, a nonsteroidal anti-inflammatory drug (NSAID) known to be hard to degrade, were among the 14 compounds partly removed (see FIG. 5A).

In one embodiment, the at least one micropollutant is selected from the group consisting of: pharmaceuticals or metabolites from pharmaceuticals, such as synthetic hormones, painkillers, lipid regulators, ß-blockers, antibiotics, antidepressants, analgesics, antiepileptics, or psychostimulants; medical products, such as radiocontrast agents (iodinated X-ray contrast media); Veterinary pharmaceuticals, such as hormones, or antibiotics; Animal feed additives, such as growth enhancers; Personal care products (PCPs), such as sun/UV screens, antioxidants, preservatives, antimicrobials, nitro- and polycyclic musks, disinfection by-products, or insect repellants; biocides, such as herbicides, insecticides, fungizides, or biocides; or industrial chemicals, such as flame retardants, anti-oxidants, plasticizers, coordination complexes, corrosion inhibitors, coolants, incineration products. In one further embodiment, the at least one micropollutant is selected from the group consisting of sulfadiazines (sulfamethoxazole, AC-sulfadiazine, sulfadiazine), diclofenac, propranolol, sulfamethizole, venlafaxine, carbamazepine, iopromide, iohexol, iopamidol, iomeprol, citalopram, atenolol, metoprolol, propranolol, sotalol, trimethoprim, ciprofloxacin, tramodol, 17a-ethinylestradiol, clarothromycin, erythromycin, roxithromycin, diatrizoic acid, phenazone, 17a-ethinylestradiolibuprofen, naproxen, bezafibrate, fenofibric acid, clofibric acid, caffeine, exiopromide, trenbolone acetate, tetracyclines, chloramphenicol, arsenic roxarsone, methylbenzylidene camphor (4-MBC), hydroxy benzoic acid, triclosan, tonalide (AHTN), N-nitrosodimethyl-amine (NDMA), N,N-diethyl-metatoluamide (DEET), alachlor, atrazine, bentazone, 2,4 D, diuron, carbaryl, dieldrin, dichlorodiphenyltrichloroethane (DDT), vinclozolintributyl tin (TBT), brominated diphenyl ethers (PBDE), nonyl phenol (NP), bisphenol A, perfluorooctanesulfonic acid (PFOS), perfluorooctanoic acid (PFOA), butylated hydroxyanisole (BHA), diethyl phthalate (DEP), ethylene-diaminetetraacetic acid (EDTA), benzotriazole (BTSA), dioxins, and polyaromatic hydrocarbons (PAHs).

In method 200, a wastewater treatment process with carbon, and nitrogen, phosphorus and enhanced micropollutant removal by switching direction of wastewater flow is shown. FIGS. 2A, 2B, 2C present a schematic view of one embodiment of an exemplary wastewater treatment process with carbon, nitrogen and enhanced micropollutants removal with alternating feeding to the micropollutants removal step. Micropollutant removal exemplified with three biological reactor stages 164, 165, 166 and three different phases for operation, 1$^{st}$ Phase (top view) 2$^{nd}$ Phase (middle) and 3$^{rd}$ Phase (bottom).

The treatment stages 110-150 are similar to an example of traditional treatment as exemplified in method 100 and FIG. 1, where only the more easily biodegradable micropollutants are removed. The more recalcitrant micropollutants are further treated and removed in the post-treatment 160.

In one embodiment, the step of treating the main stream 105 (i.e. step (b)) comprises treating the main stream with bacteria to reduce the content of carbogenous compounds to provide depleted wastewater 107 comprising at least one micropollutant. In one embodiment, the step of treating the main stream 105 to reduce the content of carbogenous and nitrogenous compounds (i.e. step (b)) comprises treating the main stream with bacteria 130 to remove organic compounds, treating the main stream with bacteria under aerobic conditions 140 to oxidize $NH_4^+$ to $NO_3^-$, and/or treating the main stream with bacteria under anoxic conditions 150 to convert $NO_3^-$ to $N_2$. In one embodiment, step (b) comprises the consecutive steps of treating the main stream with bacteria under aerobic conditions 130 to remove organic compounds. Treating the main stream with bacteria under aerobic conditions 140 to oxidize $NH_4^+$ to $NO_3^-$. Treating the main stream with bacteria under anoxic conditions 150 to convert $NO_3^-$ to $N_2$.

The invention with switching direction of water flow to the down-stream micropollutant treatment 160 is exemplified in FIGS. 2A-C. One biological reactor stage 164 is in the first phase temporarily out of main post-treatment line, receiving biological untreated wastewater high in easily biodegradable carbon, that is the side stream 106 diverted from the main stream 105 before treatment stages 110-150, or possibly after treatment stages 110 or 120 as can be seen in FIGS. 2A-C. Under anaerobic conditions in stage 164 an enrichment of organic storage products, such as PHA, is obtained within the microorganisms 161, such as bacteria. The outlet wastewater from this stage is going back to the main treatment line for further treatment. Down-stream, micropollutant, nitrogen and phosphorus removal are performed in the main treatment line in 165 and 166 with enhanced removal capacity due to carbon source obtained by microorganisms 162 and 163, such as bacteria, from previous storage phase(s).

In the second phase, exemplified in FIG. 2, a switch in wastewater flow takes place, directing the effluent from 150 into stage 164, now with microorganisms 161, such as bacteria, enriched with organic carbon, where after the wastewater continues to stage 165 for further treatment. Stage 166, being the reactor with lowest available biodegradable carbon, due to the extended operation time in main treatment line, is taken out of post-treatment line and supplied with biological untreated wastewater for bacterial enrichment of biodegradable carbon supply, for the microorganisms 163. When stage 164 is taken into operation in the main treatment line, the stored organic carbon of the microorganisms 161, such as polyhydroxy alcanoic acids (PHA) are used for a range of different metabolic activities. For instance, under anoxic conditions, heterotrophic bacteria can denitrify nitrate and nitrite to nitrogen gas, using the PHA as electron donor. PAO have the capacity to use the PHA as carbon source for enhanced phosphorus uptake and this can take place under both aerobic and anoxic conditions with oxygen and nitrate, respectively, as electron acceptor. The biological growth and activity, due to usage of stored PHA, gives the conditions for enhanced micropollutant removal through co-metabolism. In addition to enhanced micropollutant removal, an enhanced nitrogen and/or phosphorus removal can simultaneous be achieved giving highest possible efficiency of PHA utilization. In stage 165 of phase 2, further micropollutant, nitrogen and phosphorus removal takes place.

In one embodiment, the method comprises at least two cycles. In the first cycle the second portion of microorganisms 162 is used to treat the depleted wastewater 107, whereas the first portion of microorganisms 161 is used to treat the side stream 106. In the second cycle the first portion of microorganisms 161 is used to treat the depleted wastewater 107, whereas the second portion of microorganisms 162 is used to treat the side stream 106.

Dividing into more than one stage in the main treatment micropollutant line, gives the advantages of using different redox conditions (aerated or unaerated), but also giving the benefits of optimizing removal rates, where a higher removal rate is obtained at the higher substrate concentration(s).

In one embodiment, the portions of microorganisms 161, 162, 163 having the ability of degrading the at least one micropollutant are either aerated or unaerated or a combination of aerated and unaerated.

For instance, if stage 164 in phase 2 is operated under anoxic conditions, stage 165 can be operated under aerobic condition, using the remaining PHA for growth and enhanced phosphate uptake with oxygen as electron acceptor, with aerobic conditions for enhanced micropollutant removal. Further on, aerobic conditions give possibility of oxidizing remaining ammonium ($NH_4$) in the wastewater to nitrite and nitrate. Autothropic nitrification, where ammonium is the energy donor and oxygen the electron acceptor, provides favourable conditions for enhanced micropollutant removal. In the third phase in FIG. 2, reactor stage 166 is brought back into main treatment line by switching the outlet from 150 into this stage, where after the water flows to 164 and thereafter leaves the system. Reactor 165 is fed the biological untreated wastewater for enhanced carbon storage in order to complete the cycle, where the next phase after the third one is again the first phase.

Thus in one embodiment, at least two different reactors stages 164 and 165 are used for the step of micropollutant treatment 160 (i.e. step (c)). In one further embodiment, at least three reactor stages 164, 165 and 166, such as 4, or 5 reactor stages, are used for the step of micropollutant treatment 160 (i.e. step (c)). In one further embodiment, the inlet and of the reactor stages 164, 165 and 166 can be switched between the side stream 106, the depleted water 107 stream and the outlet of the other rector stages 164, 165, 166. Similarly, the outlets of the stages can be switched between of the other rector stages 164, 165, 166, back to the main treatment line for further treatment, or as outlet for treated water 170.

In one embodiment, the method comprises treating the depleted wastewater with a second portion of microorganisms 162, such as bacteria, together with a third portion of microorganisms 163, both having the ability of degrading the at least one micropollutant, thereby providing treated water 170, while the first portion of microorganisms 161 is being enriched by feeding them with the side stream 106.

In one embodiment, the method comprises at least three cycles. In the first cycle the second portion of microorganisms 162, such as bacteria, followed by the third portion of microorganisms 163 is used to treat the depleted wastewater 107, whereas the first portion of microorganisms 161 is used to treat the side stream 106. In the second cycle the first portion of microorganisms 161 followed by the second portion of microorganisms 162 is used to treat the depleted wastewater 107, whereas the third portion of microorganisms 163 is used to treat the side stream 106. In the third cycle the third portion of microorganisms 163 followed by the first portion of microorganisms 161 is used to treat the depleted wastewater 107, whereas the second portion of microorganisms 162 is used to treat the side stream 106.

In method 300, a wastewater treatment process with carbon, nitrogen, phosphorus and enhanced micropollutants removal by transferring microorganisms 161, 162, 163, such as bacteria, backwards and forwards between reactor stages 164, 165, 166 is shown. FIG. 3 presents a schematic view of a one embodiment of alternating access to easily biodegradable carbon compounds by transferring microorganisms 161, 162, 163 backwards and forwards between reactor stages 164, 165, 166. The treatment stages 110-150 are similar to an example of traditional treatment as exemplified in FIG. 1, where only the more easily biodegradable micropollutants are removed. The wastewater is divided into a main stream 105 being treated by treatment stages 110-150, and a side stream 106 being treated by none, or stages 110 or 110 and 120, of the treatment stages 110-150. The more recalcitrant micropollutants are further treated and removed in the post-treatment 160.

In the method 300, one biological reactor stage 164 is permanently out of main post-treatment line, being the reactor stage where enrichment of easily biodegradable carbon storage always take place, but integrated with the main post-treatment line through the exchange of microorganisms 161, 162 and 163, but not the water, between biological reactor stages 164 to 165 and 166 to 164 and possibly between reactor stages 165 to 166.

After enrichment of carbon to storage products, such as PHA, microorganisms 161 are transferred continuously or intermittent to reactor stage 165 with a transfer device that to large degree limits the amount of water brought with the microorganisms. For instance, microorganisms 161 grown as a biofilm on suspended carriers 108 (such as MBBR carriers) can, but not limited to, be transferred with an airlift pump, where a perforated slide prevents water to follow the suspended carriers 108, to reactor stage 165. In this reactor stage, the stored organic carbon, such as PHA, is used for a range of different metabolic activities, such as previous mentioned, including micropollutant removal, nitrogen and phosphorus removal. Outlet water from 165 could be discharged as effluent water (also referred to as treated water 170), but preferable, as exemplified in FIG. 3, be further treated in an additional reactor stage 166.

Microorganisms, such as the biofilm on suspended carriers 108, could be transferred back from stage 165 to stage 164 using an airlift pump, or similar, in the case outlet water from 165 is discharged as effluent water, but preferable, as exemplified in FIG. 3, follow the water into an additional reactor stage 166 for further treatment. Dividing into more than one stage in the main treatment micropollutant line, gives the advantages of using different redox conditions (aerated or unaerated), but also giving the benefits of optimizing removal rates, where a higher removal rate is obtained at the higher substrate concentration(s), similar to as previously explained in method 200 above. From the last reactor stage 166, carriers, but not the water, is transferred back to stage 164 for new enrichment of carbon storage, and effluent water, separated from the carriers with sieves or similar, is discharged as effluent water.

In one embodiment, microorganisms 161, 162, 163 are grown on suspended carrier elements (108).

In one embodiment, microorganisms 161, 162, 163, such as bacteria growing on carriers 108, can be transferred actively between the reactor stages 164, 165 and 166, without transfer of water. Such transfer could be facilitated by an airlift pump, where a perforated slide removes most of the water from the carriers. In one further embodiment, microorganisms 161, 162, 163, such as bacteria growing on carriers 108, can be transferred between the reactor stages 165 and 166 by following the flow of water through the reactors.

In method 400, a wastewater treatment process with carbon removal, nitrification and micropollutants removal by switching positions of reactor stages 164, 165, 166 (containing microorganisms 161, 162,163) is shown. FIGS. 4A-B illustrates a scheme of a one embodiment used in an experimental study of a wastewater process using the system according to the present invention where alternating access to easily biodegradable carbon compounds is obtained by switching the positions of physically movable reactor stages comprising the microorganisms 161, 162 and 163 for treatment of micropollutants, in and out of the side stream 106 and the stream of depleted wastewater 107. FIGS. 4 A and B shows the configuration of Moving Bed Biofilm Reactor (MBBR) system operated according the invention where in FIG. 4A, two MBBRs 164 165 are treating effluent from a municipal wastewater for micropollutant removal and a third reactor 166 is temporarily treating diluted raw wastewater being exposed to easily biodegradable carbon source. After two days of operation, as seen in FIG. 4B, reactor 166 is moved into treatment line, by re-directing the wastewater flow and reactor 164 is becoming the second reactor in line. Reactor 165 is moved out of treatment line and temporarily exposed to the diluted raw wastewater. After another 2 days of operation, a new shift takes place, where reactor 165 will be first in line treating the effluent of the wastewater treatment plant.

In one embodiment, the duration time for feeding of the microorganisms for removal of micropollutants with the side stream to side stream 106 wastewater is from 5 minutes up to 1 week. This wide range is because of factors such as that the actual uptake of bioavailable carbon by microorganisms, such as bacteria, is a very fast process. Thus, feeding durations in the minute scale, such as 5 minutes long, will be enough for the method of the invention to function. Such rapid feeding is possible if bioreactor volumes are small, or if microorganisms are transferred between reactors such as in system 300. Using short feeding cycles may result in slower bacterial growth compared to when using longer feeding cycles. If large reactor volumes are used and the side stream nutrient concentration is low, the nutrient concentration may increase at a gradient. In such scenarios, viable microorganisms for micropollutant removal may be obtained with feeding times as long as one week. Using long feeding cycles (>1 week) may result in loss of ability of degrading micropollutants of the side stream 106 wastewater, compared to when shorter feeding cycles. For most systems, practical feeding times are found to be in the range of 10 minutes to 3 days, or between 30 minutes to 2 days. Thus in one embodiment, the duration of the feeding step (i.e. step (d)) of the microorganisms 161, 162, 163 with the side stream 106 is between 10 minutes and 3 days, or between 30 minutes to 2 days. Shorter feeding time of the microorganisms may also be called for in embodiments when microorganisms on suspended carriers 108 which can move freely with the water flow, from one reactor to another, such as in specific embodiments of method 300. In such a case, the movement of the suspended carriers 108 will be dependent on the water flow, and the suspended carriers 108 may have to be moved after as little as 30 minutes to maintain an even distribution in the reactors.

Experimental Results

FIGS. 5A-B present data from an experimental study on micropollutant removal over time when spiked with different micropollutant compounds in batch trials for Moving Bed Biofilm Reactors (MBBRs) operated according to the invention. Legend A, B and C stand for reactor A, B and C respectively. For two days prior to the batch trial, reactor A was feed by the effluent from wastewater treatment plant, then effluent from reactor A entered into reactor B. Reactor C was fed by diluted raw wastewater. The micropollutant treatment system 160 was populated using bacteria from an MBBR operated on a wastewater from a hospital. Effluent from a municipal wastewater treatment plant, representing outlet of stage 150 (i.e. the depleted wastewater 107), was treated in a three-stage MBBR system, where one MBBR was alternatively always exposed to easily biodegradable carbon source from biological untreated wastewater (i.e. the side stream 106), as seen in FIG. 4. Three times per week, a shift in position was done where the MBBR that had been operated on diluted raw wastewater was placed first in the micropollutant removal line, the previously first MBBR was moved to the second position and the last MBBR was moved out of micropollutant removal line, into temporarily treatment of diluted raw wastewater. After 4 months of continuous operation, batch trials were performed where 17 recalcitrant spiked pharmaceuticals were added (3.43-19.32 ug/L). The pharmaceuticals were selected from common micropollutants often present in communal wastewater. FIG. 5 shows first-order kinetics fitting of concentration plots of pharmaceuticals in the batch trials. 14 out of the 17 compounds were degraded to more than 20%.

Figure 6A:
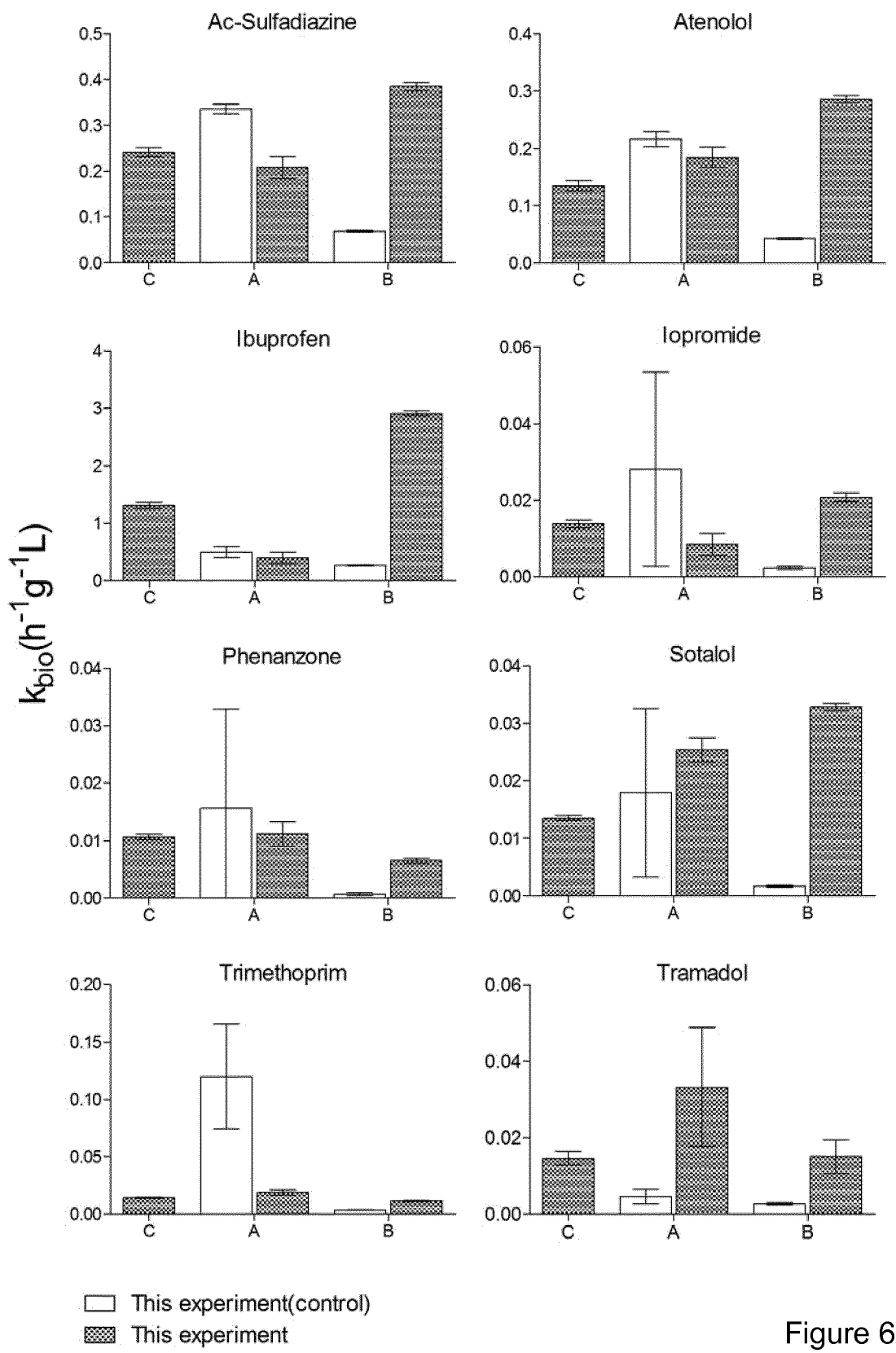
FIG. 6A-B shows micropollutant removal rate constants per gram of biomass per liter (kbio) in wastewater treated according to the method of the present invention.
Figure 6B:
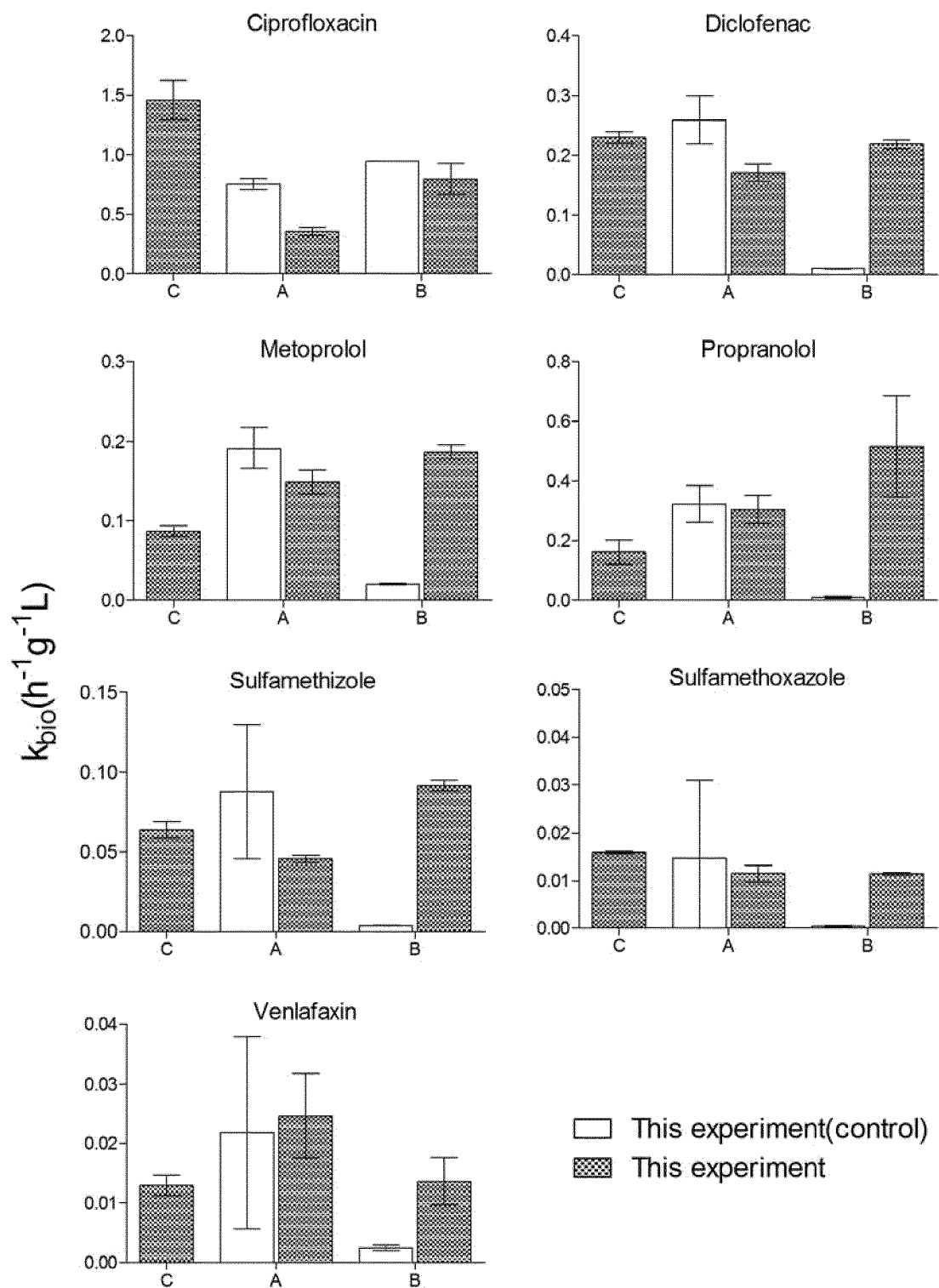

FIGS. 6A-B presents data from an experimental study on micropollutant removal comparing removal rate constants from batch trials when spiked with different micropollutant compounds to MBBRs operated according to the invention and when operated according to a reference mode. In this study, (C), (A) and (B) represents the three different MBBRs when operated according to the invention. For two days prior to the batch trial, A was the first reactor in series and B was the second reactor and C was receiving diluted raw wastewater.

After the batch trial, two of the MBBRs were kept in continuous operation in series with the same source of effluent, but without any temporarily switch to easily biodegradable carbon source from biological untreated diluted raw wastewater and maintaining the same position in the treatment line, with one of the MBBR always being first in line and the other MBBR always second in line receiving the effluent water from the first MBBR. This operation scheme represents a reference operation mode to the invention. After 5 weeks of operation in reference mode, a new batch trial was performed, where removal rates for the different micropollutants were determined ("This experiment(control)", A and B).

Removal rate constants for 15 different micropollutants determined in the batch trials are presented in FIGS. 6A-B, where results both obtained when the MBBRs were operated according to the invention and when operation was performed in reference mode. Results showed a generally higher removal rate for all three biomass systems when operated according to the invention, this indicates higher availability of active biomass or carbon for co-metabolism. Degradation of compounds typical difficult to degrade biologically, such as diclofenac, proved to be significantly higher than what is achieved in traditional biological wastewater treatment systems. When operated in reference mode in series, the rate constants generally drop significant in the second reactor, which is not the case when operation is done according to the invention. This indicates a lack of active biomass or carbon for co-metabolism. The overall removal rate for an MBBR system was therefore higher when operated according to the invention.

Thus, it is evident that the method according to the invention makes it possible not only to sustain, but to cultivate healthy microorganisms (biomass) in the micropollutant treatment step 160, purifying depleted (low nutrient) wastewater. More excitingly, this does not come at the price of decrease in micropollutant removal properties of the microorganisms, but instead the method of the invention enhances the microorganism properties for removal of micropollutants in the depleted wastewater 107.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method of at least partly removing at least one micropollutant from wastewater comprising carbogenous compounds and at least one micropollutant, the method comprising the steps of:
   (a) dividing the wastewater into a main stream and a side stream;
   (b) treating main stream with bacteria to reduce the content of carbogenous compounds to provide depleted wastewater comprising at least one micropollutant;
   (c) treating the depleted wastewater with a second portion of microorganisms, having the ability of degrading the at least one micropollutant, to, at least partly, remove the at least one micropollutant thereby providing treated water, wherein the second portion of microorganisms have been enriched by feeding the side stream to it before using the second portion of microorganisms in treating the depleted wastewater; and
   (d) feeding a first portion of microorganisms, having the ability of degrading the at least one micropollutant, with the side stream, to enrich them for subsequent use in treating the depleted wastewater to at least partly remove the at least one micropollutant.

2. The method of claim 1, wherein step (b) comprises;
   i.) treating the main stream with bacteria to remove organic compounds;
   ii.) treating the main stream with bacteria under aerobic conditions to oxidize $NH_4^+$ to $NO_3^-$; and/or
   iii.) treating the main stream with bacteria under anoxic conditions to convert $NO_3^-$ to $N_2$.

3. The method according to claim 2, wherein step (b) comprises the consecutive steps of:
   i.) treating the main stream with bacteria to remove organic compounds;
   ii.) treating the stream resulting from step i) with bacteria under aerobic conditions to oxidize $NH_4^+$ to $NO_3^-$; and
   iii.) treating the stream resulting from step ii) with bacteria under anoxic conditions to convert $NO_3^-$ to $N_2$.

4. The method according to claim 1, wherein the method comprises treating the depleted wastewater with a second portion of microorganisms in series with a third portion of microorganisms, both having the ability of degrading the at least one micropollutant, thereby providing treated water, while the first portion of microorganisms is being enriched by feeding with the side stream.

5. The method according to claim 1, wherein the portions of microorganisms having the ability of degrading the at least one micropollutant are either aerated or unaerated or a combination of aerated and unaerated.

6. The method according to claim 1, wherein the side stream is fed back to the main stream in step (b) for treatment with bacteria to reduce the content of carbogenous compounds, after the side stream has been used for feeding microorganisms in step (d).

7. The method according to claim 1, wherein the microorganisms are grown on suspended carrier elements.

8. The method according to claim 1, wherein the method comprises at least two cycles, in the first cycle the second portion of microorganisms is used to treat the depleted wastewater whereas the first portion of microorganisms is used to treat the side stream, and in the second cycle the first portion of microorganisms is used to treat the depleted wastewater whereas the second portion of microorganisms is used to treat the side stream.

9. The method according to claim 1, wherein the method comprises at least three cycles:
   a first cycle in which the second portion of microorganisms followed by the third portion of microorganisms is used to treat the depleted wastewater, whereas the first portion of microorganisms is used to treat the side stream;
   a second cycle in which the first portion of microorganisms followed by the second portion of microorganisms is used to treat the depleted wastewater, whereas the third portion of microorganisms is used to treat the side stream; and
   a third cycle in which the third portion of microorganisms followed by the first portion of microorganisms is used to treat the depleted wastewater whereas the second portion of microorganisms is used to treat the side stream.

10. The method according to claim 1, wherein the method comprises at least two different reactors stages for use in steps (c) and (d).

11. The method according to claim 1, wherein the at least one micropollutant is selected from the group consisting of: pharmaceuticals, metabolites from pharmaceuticals, medical products, veterinary pharmaceuticals, animal feed additives, personal care products (PCPs), biocides, herbicides, insecticides, fungizides, and industrial chemicals.

12. The method according to claim 1, wherein the at least one micropollutant is selected from the group consisting of sulfadiazines(sulfamethoxazole, AC-sulfadiazine, sulfadiazine), diclofenac, propranolol, sulfamethizole, venlafaxine, carbamazepine, iopromide, iohexol, iopamidol, iomeprol, citalopram, atenolol, metoprolol, propranolol, sotalol, trimethoprim, ciprofloxacin, tramodol, 17a-ethinylestradiol, clarothromycin, erythromycin, roxithromycin, diatrizoic acid, phenazone, 17a-ethinylestradiolibuprofen, naproxen, bezafibrate, fenofibric acid, clofibric acid, caffeine, exiopromide, trenbolone acetate, tetracyclines, chloramphenicol, arsenic roxarsone, methylbenzylidene camphor (4-MBC), hydroxy benzoic acid, triclosan, tonalide (AHTN), N-nitrosodimethyl-amine (NDMA), N,N-diethyl-metatoluamide (DEET), alachlor, atrazine, bentazone, 2,4 D, diuron, carbaryl, dieldrin, dichlorodiphenyltrichloroethane (DDT), vinclozolintributyl tin (TBT), brominated diphenyl ethers (PBDE), nonyl phenol (NP), bisphenol A, perfluorooctanesulfonic acid (PFOS), perfluorooctanoic acid (PFOA), butylated hydroxyanisole (BHA), diethyl phthalate (DEP), ethylene-diaminetetraacetic acid (EDTA), benzotriazole (BTSA), dioxins, and polyaromatic hydrocarbons (PAHs).

13. The method according to claim 1, wherein the depleted wastewater has a biochemical oxygen demand (BOD) of 0 to 100 $gO_2/m^3/5d$.

14. The method according to claim 1, wherein the biochemical oxygen demand (BOD) of the side stream wastewater is higher than 100 $gO_2/m^3/5d$.

15. The method according to claim 1, wherein a carbon additive is added to the side stream wastewater of step (a), to adjust the biochemical oxygen demand (BOD) to higher than 100 $gO_2/m^3/5d$.

16. The method according to claim 1, wherein the method comprises at least three different reactors stages for use in steps (c) and (d).

17. The method according to claim 11, wherein the at least one micropollutant is selected from the group consisting of: synthetic hormones, painkillers, lipid regulators, β-blockers, antibiotics, antidepressants, analgesics, antiepileptics, psychostimulants, radiocontrast agents, hormones, antibiotics, growth enhancers, sun/UV screens, antioxidants, preservatives, antimicrobials, nitro- and polycyclic musks, disinfection by-products, insect repellents, herbicides, insecticides, fungizides, biocides, flame retardants, anti-oxidants, plasticizers, coordination complexes, corrosion inhibitors, coolants, and incineration products.

18. The method according to claim 1, wherein the depleted wastewater has a biochemical oxygen demand (BOD) of 0 to 50 $gO_2/m^3/5d$.

19. The method according to claim 1, wherein the depleted wastewater has a biochemical oxygen demand (BOD) of 0 to 10 $gO_2/m^3/5d$.

20. The method according to claim 15, wherein the carbon additive comprises methanol or ethanol.

\* \* \* \* \*